United States Patent
Pletcher

(10) Patent No.: US 10,623,444 B2
(45) Date of Patent: Apr. 14, 2020

(54) APPARATUS AND METHOD FOR ANALYSIS OF BINARY TARGETS TO GENERATE SECURITY POLICY

(71) Applicant: General Electric Company, Schenectady, NY (US)

(72) Inventor: Joseph Pletcher, Vancouver (CA)

(73) Assignee: General Electric Company, Schenectady, NY (US)

( * ) Notice: Subject to any disclaimer, the term of this patent is extended or adjusted under 35 U.S.C. 154(b) by 156 days.

(21) Appl. No.: 15/845,216

(22) Filed: Dec. 18, 2017

(65) Prior Publication Data

US 2019/0020685 A1    Jan. 17, 2019

Related U.S. Application Data

(60) Provisional application No. 62/533,190, filed on Jul. 17, 2017.

(51) Int. Cl.
| | |
|---|---|
| *H04L 29/06* | (2006.01) |
| *G06F 9/445* | (2018.01) |
| *G06F 8/74* | (2018.01) |
| *G06F 21/70* | (2013.01) |
| *G06F 21/56* | (2013.01) |
| *G06F 8/75* | (2018.01) |

(52) U.S. Cl.
CPC ............. *H04L 63/20* (2013.01); *G06F 8/74* (2013.01); *G06F 8/75* (2013.01); *G06F 9/445* (2013.01); *G06F 21/563* (2013.01); *G06F 21/566* (2013.01); *G06F 21/70* (2013.01)

(58) Field of Classification Search
CPC ... H04L 63/20; G06F 8/74; G06F 8/75; G06F 9/445; G06F 21/563; G06F 21/566; G06F 21/70
See application file for complete search history.

(56) References Cited

U.S. PATENT DOCUMENTS 9,729,583 B1 *  8/2017  Barday ................... H04L 63/04
9,948,682 B2 *  4/2018  Anton ..................... H04L 63/10
(Continued)

OTHER PUBLICATIONS

Bergeron et al, "Static Analysis of Binary Code to Isolate Malicious Behavior", LSFM Research Group, Computer Science Department, Laval University, Quebec, Canada, downloaded in Sep. 30, 2009, from IEEE Xplore (Year: 2009).*
(Continued)

*Primary Examiner* — Tongoc Tran
(74) *Attorney, Agent, or Firm* — Fitch Even Tabin & Flannery LLP

(57) ABSTRACT

A compiled security program is received, for example, by an electronic tool. The compiled security program is in a form that is generally unreadable to a human user. The compiled program is automatically and electronically analyzed to determine permissible computer function calls that can be made by the security program. A security policy is generated by the analysis. Subsequently, the security policy can be utilized by an operating system. The operating system compares the sys calls requested by the security program as the program is executed. If the requested sys call does not match the approved sys calls, then an action can be taken.

6 Claims, 4 Drawing Sheets

(56) References Cited

U.S. PATENT DOCUMENTS

| | | | | |
|---|---|---|---|---|
| 2008/0046864 | A1* | 2/2008 | Bai | G06F 8/35 |
| | | | | 717/105 |
| 2012/0167162 | A1* | 6/2012 | Raleigh | G06F 21/57 |
| | | | | 726/1 |
| 2014/0137255 | A1* | 5/2014 | Wang | G06F 21/566 |
| | | | | 726/24 |
| 2014/0223415 | A1* | 8/2014 | van Gogh | G06F 8/75 |
| | | | | 717/123 |
| 2015/0288720 | A1* | 10/2015 | Touboul | G06F 21/51 |
| | | | | 726/1 |
| 2017/0017789 | A1* | 1/2017 | Daymont | G06F 21/556 |
| 2019/0163899 | A1* | 5/2019 | Letellier | G06F 21/52 |

OTHER PUBLICATIONS

Kerchen et al., "Towards a Testbed for Malicious Code Detection", Division of Computer Science, University of California, Davis, CA, IEEE, 1991 (Year: 1991).*

* cited by examiner

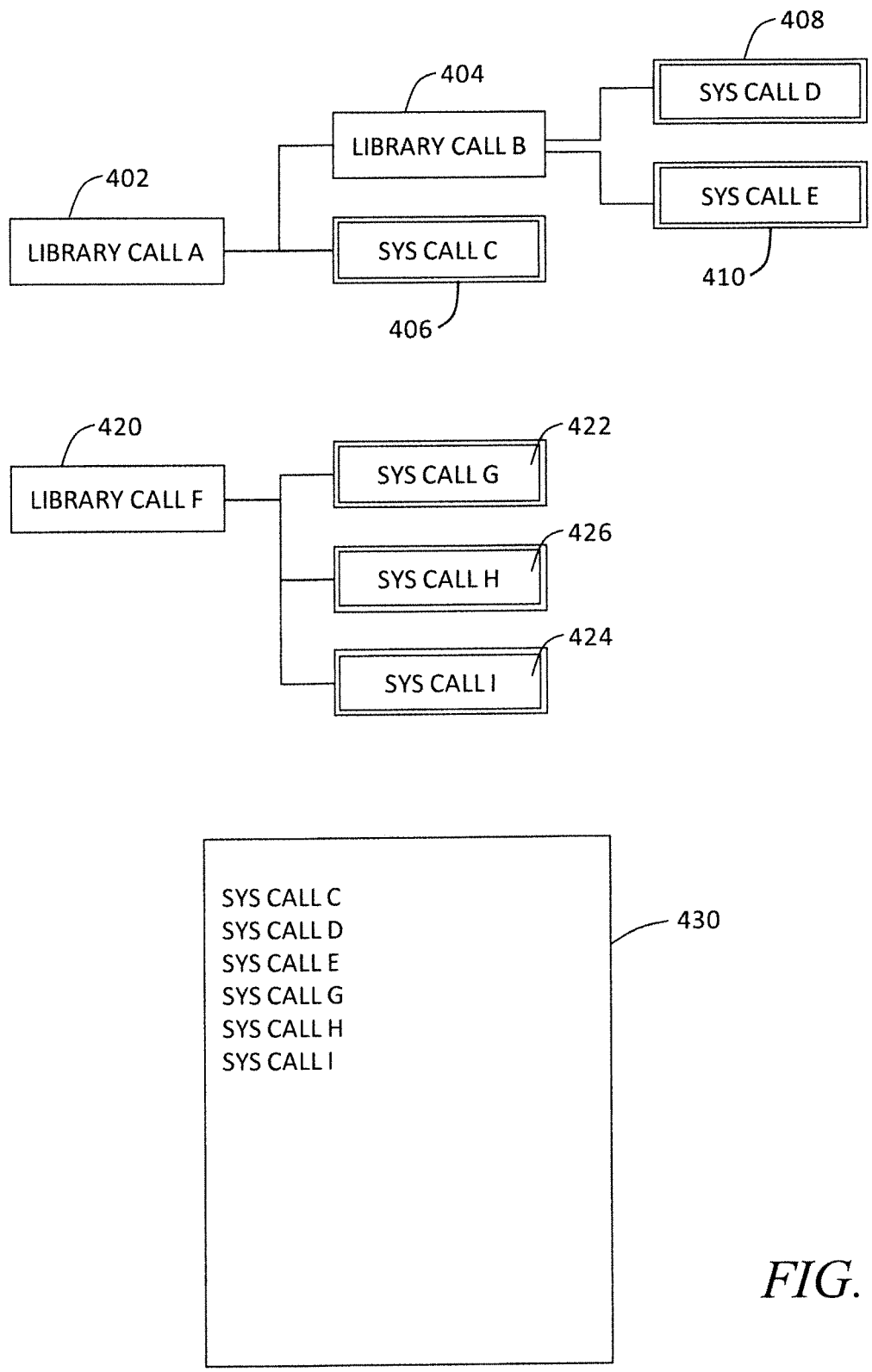

APPARATUS AND METHOD FOR ANALYSIS OF BINARY TARGETS TO GENERATE SECURITY POLICY

CROSS REFERENCE TO RELATED APPLICATION

This application claims priority to U.S. Provisional Application 62/533,190, entitled "Apparatus and Method for Analysis of Binary Targets to Generate Security Policy," filed Jul. 17, 2017, which is incorporated herein by reference in its entirety.

BACKGROUND OF THE INVENTION

Field of the Invention

The subject matter disclosed herein generally relates to the protection of computer processes and programs from outside security threats, and, more specifically, to the detection of potentially compromised security processes and programs.

Brief Description of the Related Art

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. Other types of industrial assets may include vehicles such as fleets of trucks. The design and implementation of these assets often takes into account both the physics of the task at hand, as well as the environment in which such assets are configured to operate.

The above-mentioned systems often are linked together in local networks (or other arrangements). These local networks or areas typically include electronic devices (e.g., programable logic controllers) that direct the operation of the various types of assets. Security is a concern in these types of systems. In these regards, dedicated security processes (both hardware and software) are used to protect the assets from unauthorized parties that intentionally (or unintentionally) seek to damage, harm, or control the assets.

The security programs themselves are sometimes attacked by nefarious actors. When the security processes become compromised by illegal or improper activity, then great harm and damage can be inflicted upon the industrial asset.

BRIEF DESCRIPTION OF THE INVENTION

The present invention is directed to an approach that detects whether a security process/program (protecting industrial devices or networks) has become corrupted. Advantageously, the invention prevents illegal actors from using the fact that the integrity of the security software has been compromised to damage industrial assets. In aspects, the present invention detects attempts to perform "illegal" acts (e.g., illegal "sys calls") and may take an action (e.g., shut an entire process down) when these acts are detected. In other words, policy generation is accomplished statically; an approximation of all possible code paths is examined through a software program, and any sys call which might that can ever be called is "whitelisted." No target programs are executed for initial policy generation.

In many of these embodiments, a compiled security program is received, for example, by an electronic tool. The compiled security program is in a form that is generally unreadable to a human user. The compiled program is automatically and electronically analyzed to determine permissible computer function calls that can be made by the security program. In aspects, the computer function calls are "sys calls," that are elemental calls made or executed by an operating system such as reading or writing to a memory, or opening or closing a file.

A security policy is generated by the analysis. In aspects, the security policy is an approved list of sys calls that can be made by the security program. Subsequently, the security policy can be utilized by an operating system (e.g., the Kernel of an operating system). More specifically, when the security program is executed, the Kernel compares the sys calls requested by the security program to the approved list. If the requested sys call does not match the approved sys calls, then an action can be taken. For example, the operating system may disable operation of an asset or disable execution of the security program.

BRIEF DESCRIPTION OF THE DRAWINGS

For a more complete understanding of the disclosure, reference should be made to the following detailed description and accompanying drawings wherein:

FIG. 4 comprises a diagram of aspects of an approach for detecting and reacting to compromised security processes according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the present approaches, an electronic tool (or other electronic device) receives compiled source code (although it is possible that it also might examine assembly or other types of code). The compiled source code is automatically analyzed and an approved list of sys calls (the lowest-level operating element) is determined.

Recursively, a tree of sys calls, library calls, and other calling entities defined by the compiled code is examined. Some of these calling routines may itself make another sys call, library call, or routine call thereby forming a calling tree. The present approaches recursively follow the nodes on this tree to the lowest level (e.g., where the elemental sys calls are located). This process generates an "approved" list or set of rules of approved sys calls.

In aspects, this list is attached to or associated with the Kernel of an operating system (e.g., at the local asset). Every time the security software at the asset makes a sys call, this sys call is compared to those in the approved list or set of rules. If the sys call is not in the approved list, then it is an illegal call and some sort of action can be taken. For example, the operating system may shut down the entire system or parts of the system to prevent damage to an asset.

Advantageously, the approach is automatically performed. Manual processes are susceptible to human error, and the present approaches eliminate these types of errors. Additionally, humans cannot read or understand compiled code. The present approaches quickly and efficiently read and analyze compiled code allowing a determination as to whether a security process has been compromised to be quickly made.

Additionally, many times, the source code (which could be read by a human) has been lost so that a manual review of source code to get a list of rules is impossible.

Figure 1:
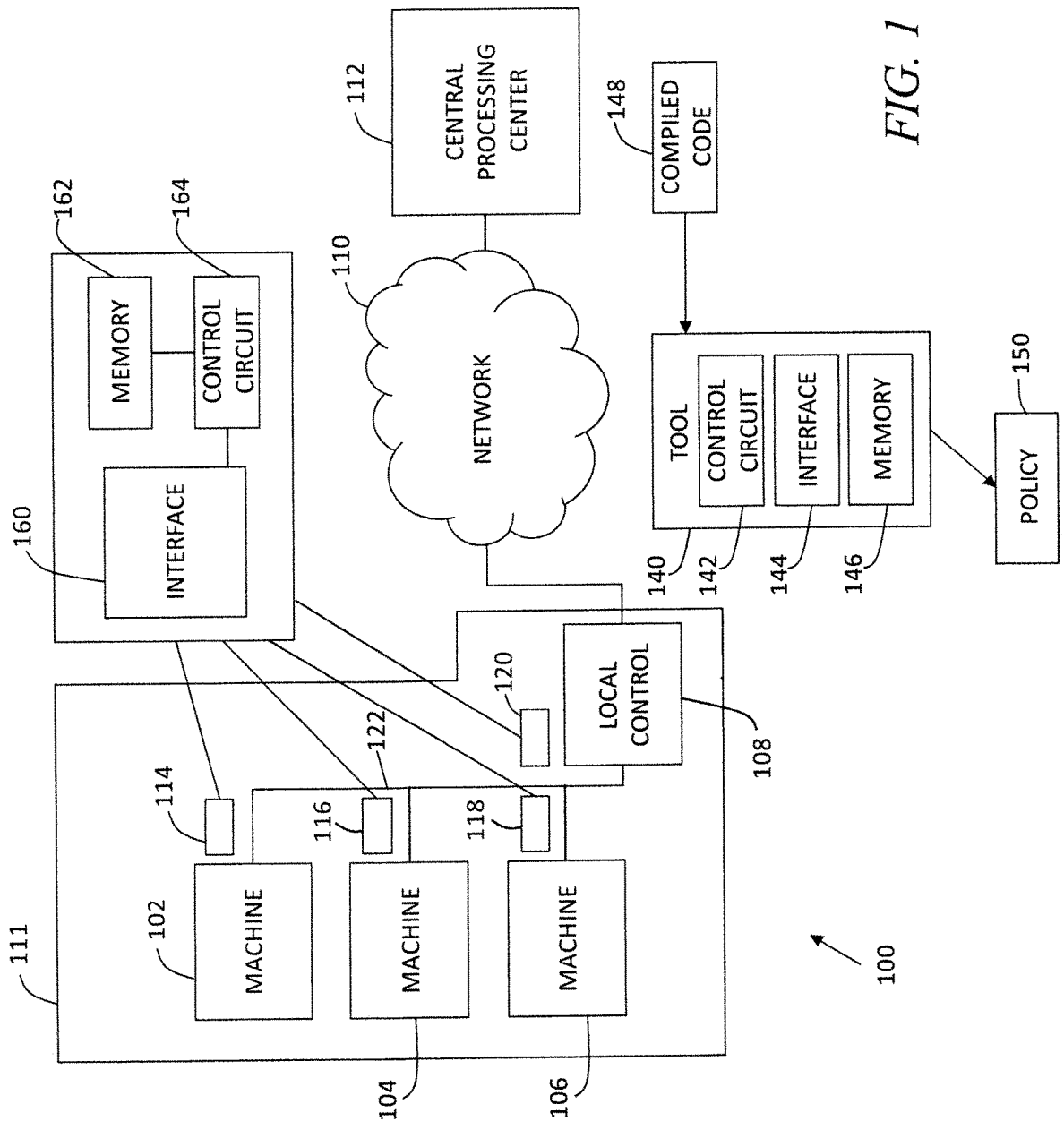
FIG. 1 comprises a diagram of a system or apparatus for detecting and reacting to compromised security processes according to various embodiments of the present invention.

Referring now to FIG. 1, one example of a system 100 for detecting the compromise of a security process is described. The system 100 includes machines 102, 104, and 106, a local control center 108, a network 110, and a central processing center 112. The machines 102, 104, and 106 may be disposed at a location 111.

Machines 102, 104, and 106 may be any type of industrial machines such as manufacturing equipment on a production line, wind turbines that generate electricity on a wind farm, healthcare or imaging devices (e.g., X-ray or MRI systems) for use in patient care facilities, or drilling equipment for use in mining operations. Other examples are possible.

The local control center 108 may include the local control device 120. Additionally, the local control center may include user interfaces (e.g., personal computers, laptops, tablets, or cellular phones) that can be used to present various types of information relating to the operation and performance of the machines 102, 104, and 106 to users.

The network 110 is any type of communication network or combination of networks. The network 110 may include devices such as gateways, routers, and processors to mention a few examples. In examples, the network 110 may be the cloud or the internet.

Local control devices 114, 116, 118, and 120 may be disposed at various locations in the system 100. For example, the local control devices 114, 116 and 118 are physically disposed at the machines 102, 104, and 106, respectively. The local control device 120 is physically disposed at the local control center 108 (e.g., at the ingress and egress point for a bus 122 that couples the machines 102, 104, and 106 together and to the local control center 108). It will be appreciated that any combination of local control devices 114, 116, 118, and 120 can be deployed. For example, local control devices 114, 116, 118, may be deployed, and 120 omitted. Alternatively, only local control device 120 may be used (and local control devices 114, 116, and 118 omitted). Additionally, all of the local control devices 114, 116, 118, and 120 may be used.

Local control devices 114, 116, 118, and 120 perform various functions to control, operate, receive data from, or transmit data (e.g., time series data obtained by sensors) from the machines 102, 104, and 106. Additionally, local control devices 114, 116, 118, and 120 operate security processes and programs that protect machines 102, 104, and 106 from nefarious acts from outside or unauthorized intruders. Further, local control devices 114, 116, 118, and 120 include processes that detect when the security programs and processes have been compromised, and when compromised, selectively take appropriate actions.

The central processing center 112 may perform various processing functions including receiving time series data from the machines 102, 104, and 106 and making predictions using the data. Other examples are possible.

An electronic tool 140 (including a control circuit 142, an interface 144, and a memory 146) is configured to receive a compiled security program or process 148 and produce a security policy 150. The electronic tool 140 may be portable or situated at a fixed location.

The compiled code may be located at any of the devices 114, 116, 118, or 120 and is known or guaranteed at one point in time (when the code is analyzed by the tool 140) to be uncorrupted. By "uncorrupted," it is meant that no nefarious actor has altered, changed, or modified the code so as to perform unauthorized activities. By "compiled" code, it is meant computer code or instructions that have been run through a compiler and, in aspects, comprise binary values. The compiled code is not understandable by a human merely reviewing the code. That is, the presence of routines, library calls, sys calls, or other programming entities are structures cannot be immediately or easily recognized by a human.

Each of the local control devices 114, 116, 118, and 120 includes an interface 160, a memory 162, and a control circuit 164. The interface 160 is configured to transmit and receive electronic information. The memory 162 is any type of memory storage device.

The control circuit 164 executes various processes and applications including security processes that protect the machines 102, 104, and 106. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 164 may be configured (for example, by using corresponding programming stored in a memory as will be well understood by those skilled in the art) to carry out one or more of the steps, actions, and/or functions described herein.

In one example of the operation of system of FIG. 1, the compiled security program 148 is received by interface 144 of the electronic tool 140. The tool 140 may be disposed at any of the machines 102, 104, 106, at the central processing center 112, or at the local control center 108 to mention a few examples.

The compiled security program 148 is in a form that is generally not understandable to a human user. The compiled program 148 is automatically and electronically analyzed by the control circuit 142 to determine permissible computer function calls that can be made by the security program. In aspects, the computer function calls are "sys calls," that are elemental calls made by an operating system such as reading or writing to a memory, or opening or closing a file.

A security policy 150 is generated by the analysis. In aspects, the security policy 150 is an approved list of sys calls that can be made by the security program. The security policy 150 may be stored in the memory 146 of the tool 140 before it is downloaded to one or more of the local control devices 114, 116, 118, and 120. Once downloaded, the security policy 150 may be stored in the memory 162 of local control devices 114, 116, 118, and 120.

Subsequently, the security policy 150 can be utilized by an operating system (e.g., the Kernel of an operating system) that is executed by the control circuit 164 of the local control devices 114, 116, 118, and 120. More specifically, when the security program at each of the local control devices 114, 116, 118, and 120 is executed by the control circuit 164, the Kernel compares the sys calls requested by the security program to the approved list. If the requested sys call does not match the approved sys calls, then an action can be taken. For example, the operating system may disable operation of an asset or disable execution of the security program. The control circuit 164 may determine electronic actions (e.g., implemented by electronic control signals) that can be communicated to users via the interface 160. The control circuit 164 may be disposed in proximity to an industrial machine (e.g., at the same plant on the same site, at the same campus, or in the same room or building). In other examples, the control circuit 164 is disposed at a central location not in proximity to an industrial machine. In this case, the central location a site that is removed from the immediate surroundings or proximity a industrial machine. For instance, the central location may be in another city, state, or country than the industrial machine.

Advantageously, these approaches are automatically performed without interaction by humans. The human error associated with manual processes is eliminated. Additionally, these approaches do not depend upon humans reading or analyzing compiled code. Further, these approaches are applicable to situations where the source code (which could be read by a human) has been lost making a manual review of source code impossible.

Figure 2:
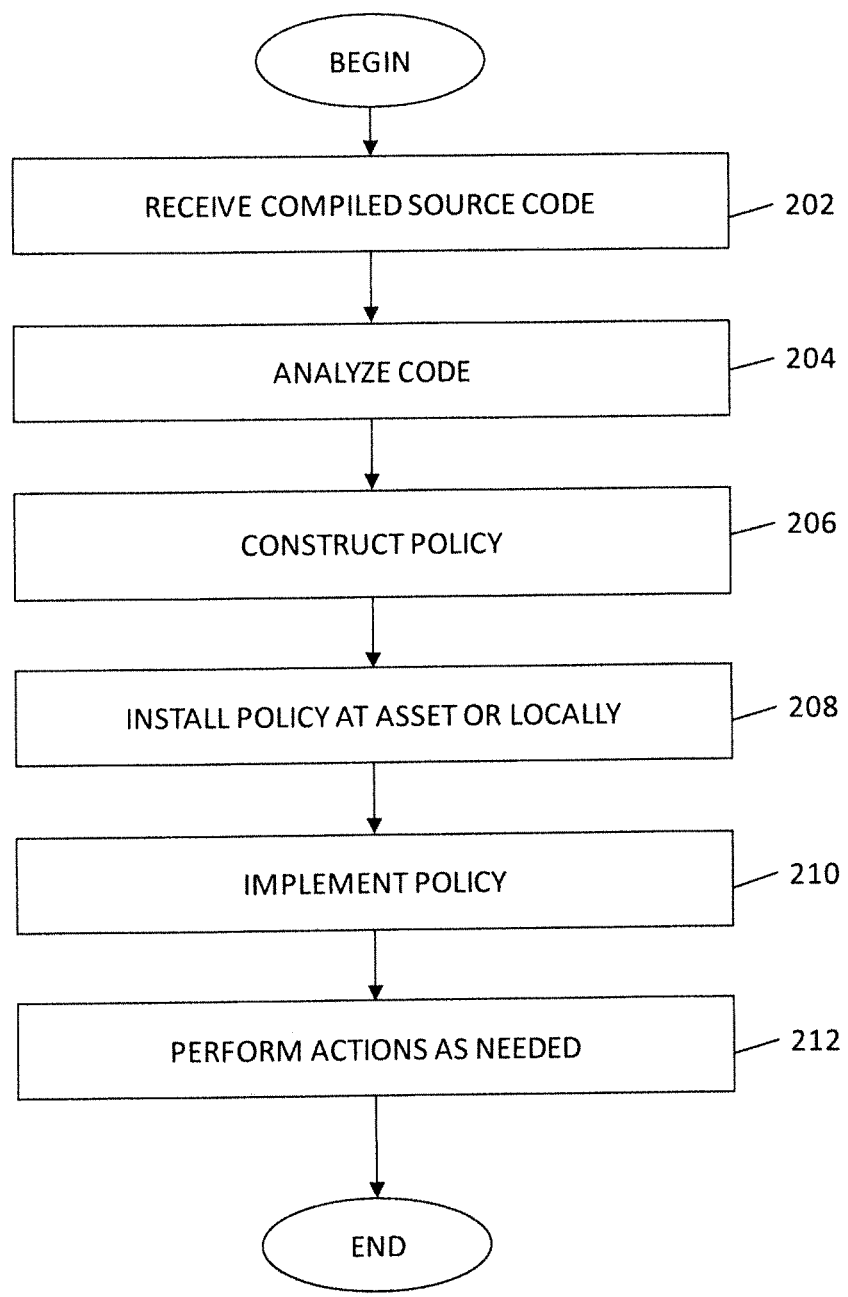
FIG. 2 comprises a flowchart of an approach for detecting and reacting to compromised security processes according to various embodiments of the present invention.

Referring now to FIG. 2, one example of an approach for detecting the compromise of a security process is described. At step 202, an apparatus (e.g., an electronic tool) receives compiled source code. The compiled source code is the compiled code for a security process or program that issues sys calls.

It will be appreciated that the approaches described herein are especially applicable to compiled code. However, it will be appreciated that these approaches are also applicable to other type of code that has a meaning that is not immediately or quickly ascertainable by humans.

At step 204, the code is analyzed. In aspects, the code is electronically parsed to determine the presence of sys calls, library routines, routines, subroutine calls, references to imports, and/or other programming constructs. As known to those skilled in the art, various parsing techniques or approaches can be used to locate these elements in the compiled code.

Some of the sys calls, library routines, routines, subroutine calls, references to imports, and/or other programming constructs may themselves call or utilize other sys calls, library routines, routines, subroutine calls, references to imports, and/or other programming constructs. Thus, a tree can be formed and the analysis traverses the tree until leaf nodes of the tree (nodes that cannot be broken into any further element) are reached. In aspects, the leaf nodes (e.g., elemental sys calls) are considered to be valid elements.

At step 206, a security policy is created. The security policy is an approved list of sys calls, library routines, routines, subroutine calls, references to imports, and/or other programming constructs that has been found in the compiled code. As mentioned and in one example, leaf nodes in the call trees are considered valid elements, and are included in the security policy. It will be appreciated, that the security policy may be implemented as any type of data structure.

At step 208, the security policy is installed at a local machine or local control center. For example, the security policy may be installed at a PLC or other type of control circuit, or may be loaded into a memory associated with the PLC or control circuit. The security policy may be protected as, for example, a Linux access controlled list. Other (and more elaborate) ways of protecting the security policy itself are possible.

At step 210, the policy is implemented. In this step, the security program at the local machine or local control center is executed and issues, for example, sys calls. These sys calls are compared to the approved sys calls listed in the security policy. If there is a match, then these calls are allowed to proceed and be executed. However, if there is no match, an appropriate action may be taken.

At step 212, an action is taken where a sys call issued by the security process does not meet the criteria of the security policy. Actions may include shutting down the machine or asset, disabling various processes operating at the machine, or issuing electronic alerts to mention a few examples. Other examples of actions are possible.

An interface may exist that performs various functions. The interface can be used for determining what action to take on a sys call not in the policy (non-approved or non-white-listed sys calls), various actions can be taken (e.g., generation of a process kill-order, the triggering of an alarm, or the sending of an email to an operator to mention a few examples).

Figure 3:
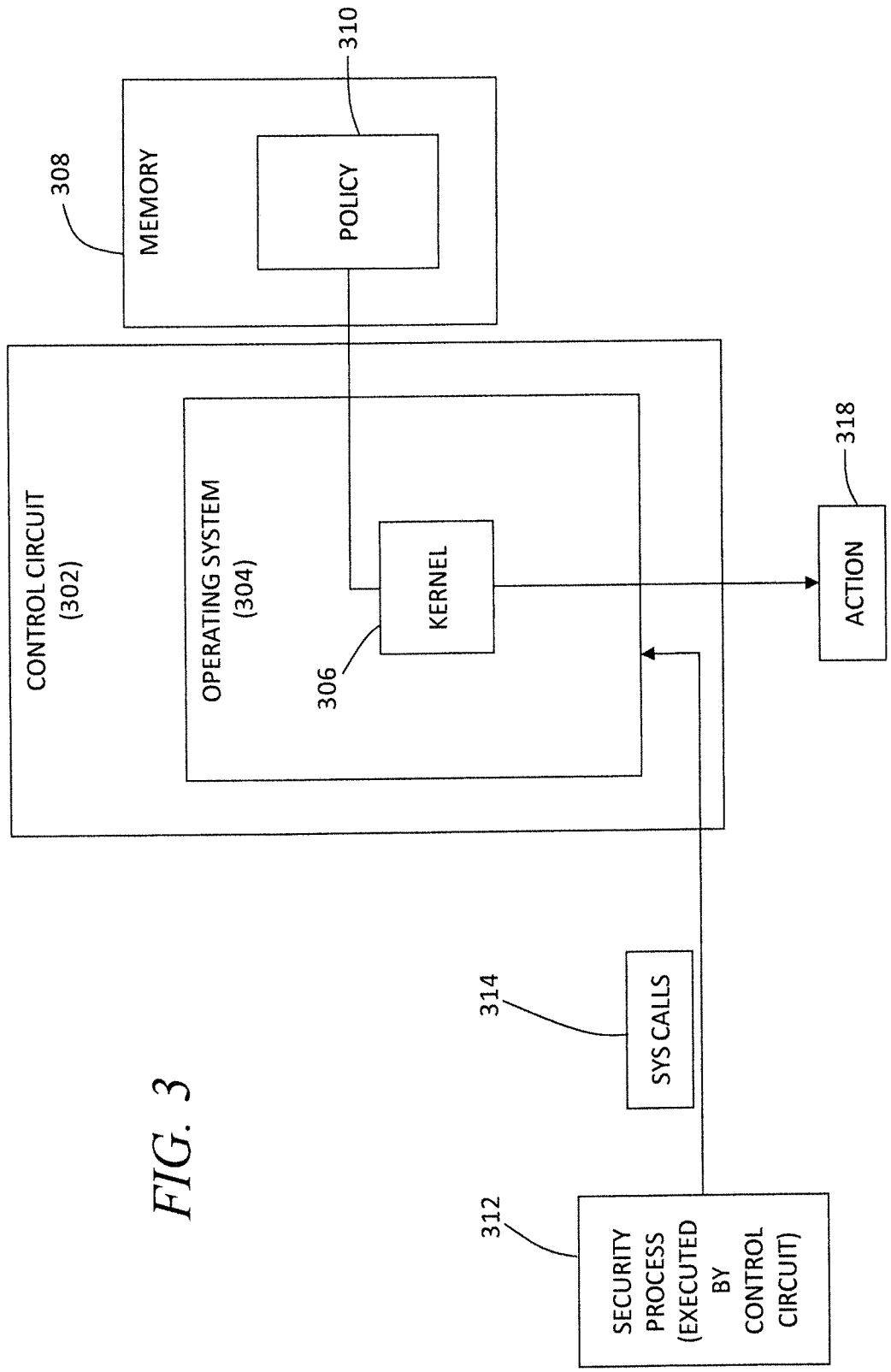
FIG. 3 comprises a diagram of a system or apparatus for detecting and reacting to compromised security processes according to various embodiments of the present invention.

Referring now to FIG. 3, one example of aspects of a system 300 for detecting the compromise of a security process is described. The system may be implemented locally such as at a local PLC or controller.

The system 300 includes a control circuit 302. The control circuit 302 executes or utilizes an operating system 304 that includes a Kernel 306. The operating system 304 performs the basic functions of the control circuit 302, such as scheduling tasks, executing applications, and controlling any peripheral device. In aspects, the Kernel 306 is one or more software processes or routines that performs low level operating system tasks such as accessing memory locations.

A memory device 308 may be any type of memory storage device and stores a set of security rules 310. The security rules 310 may be implemented as any type of data structure. For example, the security rules may be a list of approved sys calls that has been created according to the approaches described herein.

In operation, a security process or program 312 is executed by the control circuit 302 and attempts to issue sys calls 314 that the process 312 wishes to execute. The sys calls 314 are compared to the approved sys calls on the security policy 310. If there is a match, then these calls are allowed to proceed (e.g., are executed at the control circuit 302 using the operating system 304). However, if there is no match, an appropriate action 318 is generated by the Kernel 306 and this action may be taken.

Actions may include shutting down the machine, disabling various processes operating at the machine, or issuing electronic alerts to mention a few examples. In aspects, the Kernel 306 generates electronic control signals that cause the actions to be executed. Other examples as to approaches that implement an action are possible.

Referring now to FIG. 4, one example of an approach for determining security rules is described. In this example, compiled code (of a security process or program) is examined.

During the analysis of the compiled code, a library call (A) 402 and a library call (F) 420 are determined to exist in the compiled code. As is known to those skilled in the art, various parsing and analysis techniques can be used to discover the existence of these sys calls in the compiled code.

Further, as is known to those skilled in the art, a sys call is a user mode to Kernel mode contact switch where the sys call type is passed to Kernel mode and the Kernel executes the sys call on behalf of the user mode program being executed. In aspects, a sys call cannot call another sys call.

Additionally, as known to those skilled in the art, a library call is subroutine call into another piece of computer code. More specifically, a library call is a user mode call into another user mode library. A library call does not have a contact switch.

Knowledge of whether the library call (A) 402 and the library call (F) 420 can be broken down into additional sys calls or comprise additional sys calls is also maintained (or can be determined by examining the content of the library calls). In the present example, library call (A) 402 is broken into library call (B) 404 and sys call (C) 406. Library call (B) 404 is further broken into sys call (D) 408 and sys call (E) 410. Sys call (D) 408 and sys call (E) 410 cannot be broken into further sys calls. Additionally, sys call 406 cannot be broken into further sys calls.

It can be seen that library call (F) 420 is broken into further sys calls including sys call (G) 422, sys call (H) 424, and sys call (I) 426. Sys call (G) 422, sys call (H) 424, and sys call (I) 426 cannot be broken into further sys calls or other elements.

It will be appreciated that (together) the library and sys calls form a tree with the leaf nodes of the tree being sys call (B) 406, sys call (D) 408, sys call (E) 410, sys call (G) 422, sys call (H) 424, and sys call (I) 426. That is, the leaf nodes are sys call that themselves cannot be broken into another sys call or some lower level function.

The approaches (e.g., implemented as computer software) deployed in the electronic tool create and traverse the tree to find the leaf nodes sys call (B) 406, sys call (D) 408, sys call (E) 410, sys call (G) 422, sys call (H) 424, and sys call (I) 426. These leaf nodes sys call (B) 406, sys call (D) 408, sys call (E) 410, sys call (G) 422, sys call (H) 424, and sys call (I) 426 are placed in a security policy 430.

Subsequently, and as described above, the security program at the local machine or local control center is executed and issues, for example, sys calls. These sys calls are compared to the approved sys calls listed in the security policy. If there is a match, then these calls are allowed to proceed. However, if there is no match, an appropriate action may be taken.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A method, comprising:
    receiving compiled source code at an electronic tool;
    at the electronic tool, analyzing the compiled code and based upon the analyzing, forming a calling tree, the calling tree comprising an electronic tree data structure of associated programming elements, wherein the calling tree when formed has one or more leaf nodes and one or more non-leaf nodes, the leaf nodes being associated with programmatic calls, wherein the programmatic calls are sys calls including one or more of a read operation to a memory, a write operation to a memory, an opening of a file, or a closing of a file, wherein the calling tree is stored at the electronic tool;
    at the electronic tool, automatically identifying and recursively traversing the calling tree defined by the source code until all leaf nodes in the tree are reached and identified, the leaf nodes being considered as valid programming elements and being recorded in a security policy as a list of permitted calls,
    installing the security policy at a control circuit, wherein the control circuit is disposed at a local control device in physical proximity to an industrial machine;
    subsequently, executing a security program at the control circuit, the executing causing one or more programmatic calls to be made by the security program;
    comparing the calls made by the security program to the permitted calls in the security policy, and taking an action when there is not a match, and when the permitted calls are on the list allowing the calls to proceed;
    wherein a Kernel of an operating system executes the security program, and wherein the operating system performs one or more of scheduling tasks, executing applications, and controlling peripheral devices.

2. The method of claim 1, wherein a corruption of the security program by a nefarious actor has occurred, and the comparison detects that the corruption has occurred.

3. The method of claim 1, wherein the action is to issue an alert to a user.

4. A system, comprising:
    an electronic tool, the electronic tool configure to receive and analyze compiled source code, the electronic tool forming a calling tree comprising an electronic tree data structure of associated programming elements, wherein the calling tree when formed has one or more leaf nodes and one or more non-leaf nodes, the leaf nodes being associated with programmatic calls, wherein the programmatic calls are sys calls including one or more of a read operation to a memory, a write operation to a memory, an opening of a file, or a closing of a file, wherein the calling tree is stored at the electronic tool, wherein the electronic tool automatically identifies and recursively traverses the calling tree defined by the source code until all leaf nodes in the tree are reached and identified, the leaf nodes being considered as valid programming elements and being recorded in a security policy as a list of permitted calls;
    a control circuit that is in communication with the electronic tool, wherein the control circuit receives the security policy, wherein the control circuit is disposed at a local control device in physical proximity to an industrial machine, and subsequently, wherein the control circuit executes a security program, the execution of the security program causing one or more programmatic calls to be made by the security program, wherein the control circuit compares the calls made by the security program to the permitted calls in the security policy, and takes an action when there is not a match, and when the permitted calls are on the list allowing the calls to proceed;
    wherein the control circuit executes a Kernel of an operating system, which executes the security program, and wherein the operating system performs one or more of scheduling tasks, executing applications, and controlling peripheral devices.

5. The system of claim 4, wherein the security program has been corrupted by a nefarious actor, and the comparison made by the control circuit detects that the corruption has occurred.

6. The system of claim 4, wherein the action is for the control circuit to issue an alert to a user.

* * * * *